US008856496B2

(12) United States Patent
Henry et al.

(10) Patent No.: US 8,856,496 B2
(45) Date of Patent: Oct. 7, 2014

(54) MICROPROCESSOR THAT FUSES LOAD-ALU-STORE AND JCC MACROINSTRUCTIONS

(75) Inventors: G. Glenn Henry, Austin, TX (US); Terry Parks, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 890 days.

(21) Appl. No.: 13/034,808

(22) Filed: Feb. 25, 2011

(65) Prior Publication Data

US 2011/0264897 A1 Oct. 27, 2011

Related U.S. Application Data

(60) Provisional application No. 61/328,524, filed on Apr. 27, 2010.

(51) Int. Cl.
*G06F 9/30* (2006.01)
*G06F 9/38* (2006.01)

(52) U.S. Cl.
CPC .......... *G06F 9/30007* (2013.01); *G06F 9/3004* (2013.01); *G06F 9/3857* (2013.01); *G06F 9/30145* (2013.01); *G06F 9/3861* (2013.01); *G06F 9/3017* (2013.01)
USPC ....................................... 712/208

(58) Field of Classification Search
CPC . G06F 9/30145; G06F 9/3017; G06F 9/3861; G06F 9/3857
USPC ....................................... 712/208
See application file for complete search history.

(56) References Cited

U.S. PATENT DOCUMENTS

| | | | |
|---|---|---|---|
| 5,542,084 A | | 7/1996 | Lowe, Jr. |
| 6,338,136 B1 * | | 1/2002 | Col et al. .................. 712/221 |
| 6,370,625 B1 | | 4/2002 | Carmean et al. |

(Continued)

FOREIGN PATENT DOCUMENTS

WO WO2009082430 7/2009

OTHER PUBLICATIONS

Petric et al. "RENO: A Rename-Based Instruction Optimizer." Proceedings of the 32nd International Symposium on Computer Architecture. IEEE 2005 pp. 1-12.
Case, Loyd. "The Core 2: Intel Goes for the Jugular." ExtremeTech. Jul. 13, 2006. pp. 1-6. Downloaded Apr. 20, 2010 from http://www.extremetech.com/.
Tian, Xinmin. "Inside the Intel® 10.1 Compilers: New Threadizer and New Vectorizer for Intel® Core™ 2 Processors." Intel® Technology Journal. vol. 11, Issue 04, Published Nov. 25, 2007. p. 263-274.

(Continued)

*Primary Examiner* — Andrew Caldwell
*Assistant Examiner* — Benjamin Geib
(74) *Attorney, Agent, or Firm* — E. Alan Davis; James W. Huffman

(57) ABSTRACT

A microprocessor receives first and second program-adjacent macroinstructions of the microprocessor instruction set architecture. The first macroinstruction loads an operand from a location in memory, performs an arithmetic/logic operation using the loaded operand to generate a result, and stores the result back to the memory location. The second macroinstruction jumps to a target address if condition codes satisfy a specified condition and otherwise executes the next sequential instruction. An instruction translator simultaneously translates the first and second program-adjacent macroinstructions into first, second, and third micro-operations for execution by execution units. The first micro-operation calculates the memory location address and loads the operand therefrom. The second micro-operation performs the arithmetic/logic operation using the loaded operand to generate the result, updates the condition codes based on the result, and jumps to the target address if the updated condition codes satisfy the condition. The third micro-operation stores the result to the memory location.

20 Claims, 4 Drawing Sheets

(56) References Cited

U.S. PATENT DOCUMENTS

| | | |
|---|---|---|
| 6,647,489 B1 | 11/2003 | Col et al. |
| 7,458,069 B2 | 11/2008 | Ronen et al. |
| 7,937,561 B2 | 5/2011 | Col et al. |
| 8,082,430 B2 | 12/2011 | Valentine et al. |
| 2003/0236967 A1 | 12/2003 | Samra et al. |
| 2004/0034757 A1 | 2/2004 | Gochman et al. |
| 2006/0004998 A1 | 1/2006 | Saha et al. |
| 2009/0204800 A1* | 8/2009 | Hooker et al. ............... 712/245 |
| 2010/0115248 A1 | 5/2010 | Ouziel et al. |

OTHER PUBLICATIONS

Intel® 64 and IA-32 Architectures Optimization Reference Manual. Nov. 2009. pp. 3-18 to 3-21.

Patterson, David et al. "Computer Architecture: A Quantitative Approach." Morgan Kaufmann Publishers, Inc. 1996. pp. 251-261 and 278-288.

* cited by examiner

US 8,856,496 B2

MICROPROCESSOR THAT FUSES LOAD-ALU-STORE AND JCC MACROINSTRUCTIONS

CROSS REFERENCE TO RELATED APPLICATION(S)

This application claims priority based on U.S. Provisional Application, Ser. No. 61/328,524, filed Apr. 27, 2010, entitled MICROPROCESSOR THAT FUSES LOAD-ALU-STORE AND JCC MACROINSTRUCTIONS, which is hereby incorporated by reference in its entirety.

This application is related to U.S. Non-Provisional application, Ser. No. 12/100,616 (CNTR.2339), filed Apr. 10, 2008, which claims priority to U.S. Provisional Application, Ser. No. 61/027,060, filed Feb. 8, 2008, each of which is hereby incorporated by reference in its entirety.

This application is related to U.S. Non-Provisional Application, Ser. No. 13/034,839, filed Feb. 25, 2011, entitled MICROPROCESSOR THAT FUSES MOV/ALU INSTRUCTIONS, which claims priority to U.S. Provisional Application, Ser. No. 61/328,537, filed Apr. 27, 2010, each of which is hereby incorporated by reference in its entirety.

This application is related to U.S. Non-Provisional Application, Ser. No. 13/034,863, filed Feb. 25, 2011, entitled MICROPROCESSOR THAT FUSES MOV/ALU/JCC INSTRUCTIONS, which claims priority to U.S. Provisional Application, Ser. No. 61/328,537, filed Apr. 27, 2010, each of which is hereby incorporated by reference in its entirety.

FIELD OF THE INVENTION

The present invention relates in general to the field of instruction translation in microprocessors, and particularly to the fusion of macroinstructions during translation.

BACKGROUND OF THE INVENTION

Many modern microprocessors have both a user-visible architecture (sometimes referred to as "macroarchitecture"), i.e., the instruction set and resources that programmers may use, and a distinct microarchitecture. A macroinstruction is an instruction in the instruction set of the microprocessor architecture. In contrast, a micro-op is an instruction in the micro-instruction set of the microarchitecture. The execution units of such a microprocessor actually execute micro-ops rather than macroinstructions. An instruction translator translates macroinstructions into one or more micro-ops that are sent to the execution units for execution. The instruction throughput, or rate at which the microprocessor can process macroinstructions of a program, is largely a function of the rate at which the instruction translator translates program macroinstructions into micro-ops. This is particularly true for superscalar and/or out-of-order execution microprocessors.

BRIEF SUMMARY OF INVENTION

In one aspect the present invention provides a microprocessor configured to receive first and second program-adjacent macroinstructions of the instruction set architecture of the microprocessor. The first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result. The second macroinstruction instructs the microprocessor to jump to a target address if the updated condition codes satisfy a condition specified by the second macroinstruction and to otherwise execute the next sequential instruction. The microprocessor includes execution units and an instruction translator configured to simultaneously translate the first and second program-adjacent macroinstructions into first, second, and third micro-operations for execution by the execution units. The first micro-operation instructs the execution units to calculate the memory location address and to load the operand from the memory location address into the microprocessor. The second micro-operation instructs the execution units to perform the arithmetic/logic operation using the loaded operand to generate the result, to update the condition codes based on the result, and to jump to the target address if the updated condition codes satisfy the condition and to otherwise execute the next sequential instruction. The third micro-operation instructs the execution units to store the result to the memory location.

In another aspect, the present invention provides a method for a microprocessor to process first and second program-adjacent macroinstructions of the instruction set architecture of the microprocessor, wherein the first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result, wherein the second macroinstruction instructs the microprocessor to jump to a target address if the updated condition codes satisfy a condition specified by the second macroinstruction and to otherwise execute the next sequential instruction. The method includes simultaneously translating the first and second program-adjacent macroinstructions into first, second, and third micro-operations for execution by execution units of the microprocessor. The first micro-operation instructs the execution units to calculate the memory location address and to load the operand from the memory location address into the microprocessor. The second micro-operation instructs the execution units to perform the arithmetic/logic operation using the loaded operand to generate the result, to update the condition codes based on the result, and to jump to the target address if the updated condition codes satisfy the condition and to otherwise execute the next sequential instruction. The third micro-operation instructs the execution units to store the result to the memory location.

In yet another aspect, the present invention provides a computer program product encoded in at least one computer readable medium for use with a computing device, the computer program product comprising computer readable program code embodied in said medium for specifying a microprocessor configured to receive first and second program-adjacent macroinstructions of the instruction set architecture of the microprocessor. The first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result. The second macroinstruction instructs the microprocessor to jump to a target address if the updated condition codes satisfy a condition specified by the second macroinstruction and to otherwise execute the next sequential instruction. The computer readable program code includes first program code for specifying execution units and second program code for specifying an instruction translator configured to simultaneously translate the first and second program-adjacent macroinstructions into first, second, and third micro-operations for execution by the execution units. The first micro-operation instructs the execution units to calculate the memory location address and to load the operand from the memory location address into the microprocessor. The second micro-operation instructs the execution units to perform the arithmetic/logic operation using the loaded operand to generate the result, to update the condition codes based on the result, and to jump to the target address if the updated condition codes satisfy the condition and to otherwise execute the next sequential instruction. The third micro-operation instructs the execution units to store the result to the memory location.

DETAILED DESCRIPTION OF THE INVENTION

Figure 1:
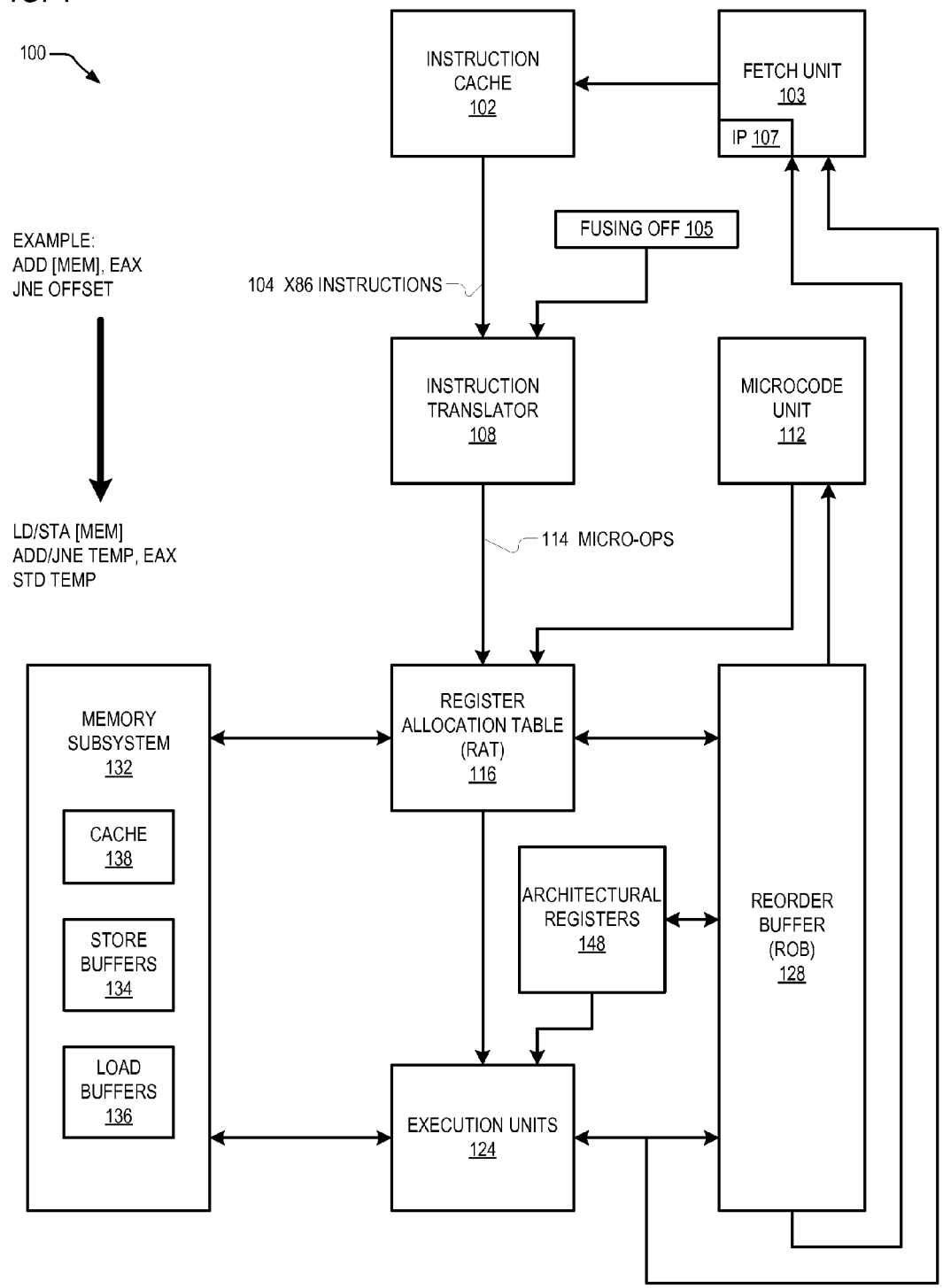
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 102 and a fetch unit 103 configured to control the fetching of macroinstructions 104 from the instruction cache 102. The fetch unit 103 includes an architectural instruction pointer 107 register. When an instruction of the instruction set architecture is retired, the architectural instruction pointer 107 is updated with the address of the next instruction in the instruction stream. In the case of a non-taken branch instruction, the address of the next instruction in the instruction stream is the next sequential instruction. In the case of a taken branch instruction, the address of the next instruction in the instruction stream is the target address of the taken branch instruction. Most of the time, the fetch address provided by the fetch unit 103 to the instruction cache 102 is different from the architectural instruction pointer 107 value because of the pipelined nature of the microprocessor 100 and because the microprocessor also includes a branch predictor that predicts the direction and target address of branch instructions much earlier in the pipeline than they are retired. The macroinstructions 104 are specified by the instruction set architecture of the microprocessor 100. According to one embodiment, the instruction set architecture of the microprocessor 100 conforms substantially to the x86 architecture (also referred to as IA-32) and the macroinstructions 104 are instructions from the x86 instruction set architecture. A processor is an x86 architecture processor if it can correctly execute a majority of the application programs that are designed to be executed on an x86 processor. An application program is correctly executed if its expected results are obtained. In particular, the microprocessor 100 executes instructions of the x86 instruction set and includes the x86 user-visible register set.

The microprocessor 100 also includes an instruction translator 108 configured to translate the macroinstructions 104 into micro-operations (micro-ops or uops) 114 for execution by execution units 124 of the microprocessor 100. The instruction translator 108 will be described in more detail below.

The microprocessor 100 also includes a microcode unit 112 that includes a microcode memory configured to store microcode, or microcode routines, and a microsequencer for fetching from the microcode memory instructions of the microcode, which are also micro-ops 114.

The microprocessor 100 also includes a register allocation table (RAT) 116 that receives the micro-ops 114 from the instruction translator 108 and the microcode unit 112 in program order. The RAT 116 generates and maintains a table of dependency information for the micro-ops 114. The RAT 116 is coupled to execution units 124, a memory subsystem 132, and a reorder buffer (ROB) 128 of the microprocessor 100. The execution units 124 execute the micro-ops 114, and are described in more detail with respect to FIG. 2. The memory subsystem 132 includes a data cache 138 or cache hierarchy, store buffers 134, and load buffers 136. The store buffers 134 hold data waiting to be written to memory, such as to the data cache 138. The load buffers 136 receive data fetched from memory waiting to be loaded into architectural registers 148 or non-architectural registers (not shown) of the microprocessor 100. According to one embodiment, the architectural registers 148 include the well-known x86 EFLAGS register.

Figure 5:
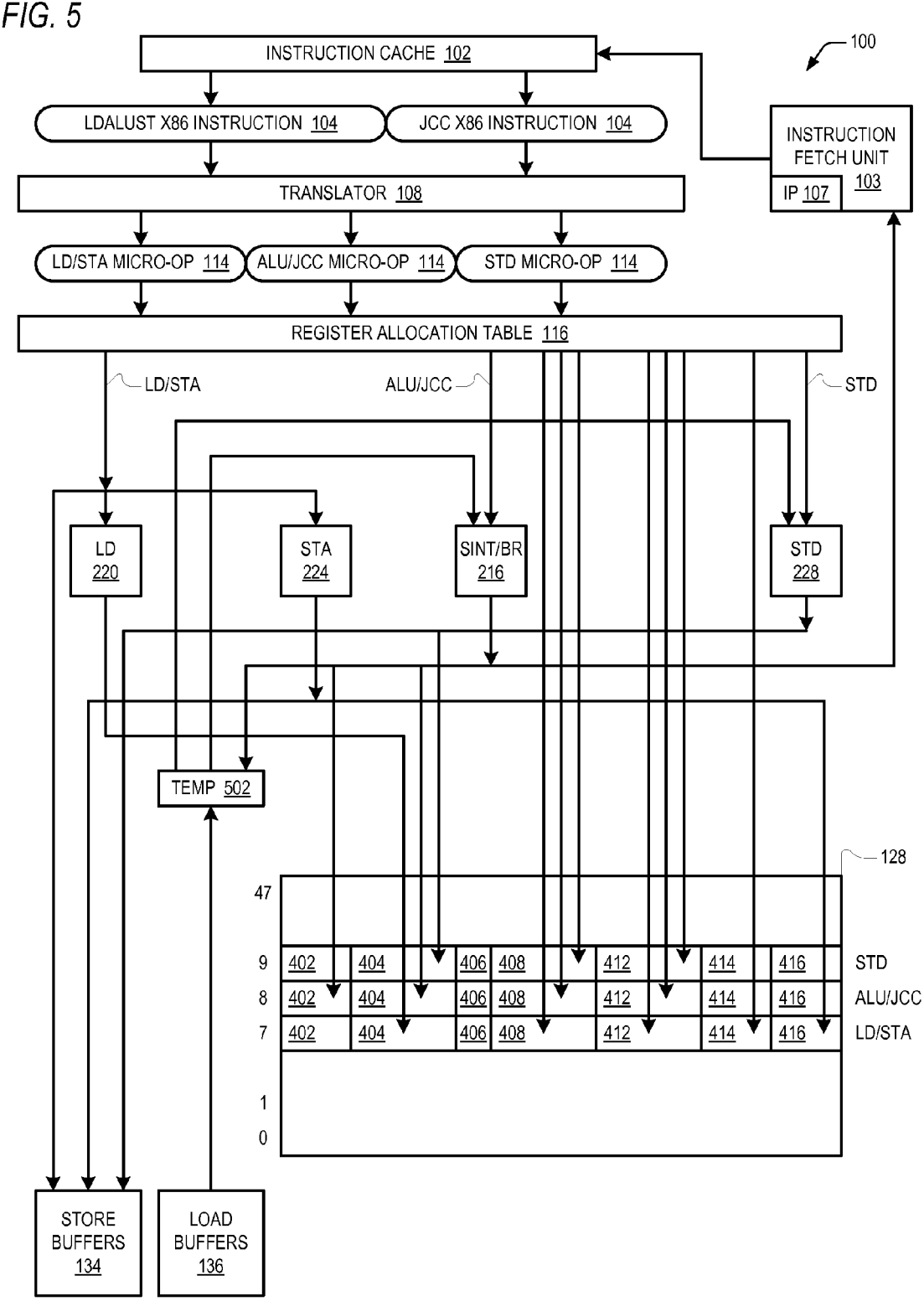
FIG. 5 is a block diagram illustrating operation of the microprocessor of FIG. 1 to perform instruction fusing and execution of the resultant translated micro-ops.

The ROB 128 is a circular queue, or array, of entries, whose structure is shown in more detail with respect to FIG. 5. Each ROB entry 432 stores information for a different micro-op 114. The RAT 116 also allocates an entry in the ROB 118 for each micro-op 114 before dispatching it to a reservation station (not shown) where the micro-op 114 waits to be dispatched to an execution unit 124. Thus, the ROB 128 maintains the micro-ops 114 in program order, which enables the ROB 128 to retire in program order the micro-ops 114 and their corresponding macroinstructions 104 from which they were translated.

Advantageously, the instruction translator 108 is configured to fuse two macroinstructions 104 into three micro-ops 114. That is, when the instruction translator 108 detects a condition in which it receives two adjacent macroinstructions 104 of a specific type from the stream of macroinstructions 104, the instruction translator 108 is capable of decoding and translating the two adjacent specific type macroinstructions 104 into three micro-ops 114 that collectively perform the function, or semantic, instructed by the two fused macroinstructions 104. More specifically, the instruction translator 108 fuses two adjacent macroinstructions 104 in which the first is a load-alu-store (LdAluSt) type macroinstruction and the second is a conditional jump macroinstruction. An example of a LdAluSt type macroinstruction is an x86 ADD [mem], EAX instruction, which instructs the microprocessor 100 to load the operand from the memory location specified by the [mem] address into the microprocessor 100, adds the memory operand to the value in the EAX register, and stores the resultant sum of the addition operation in the memory location specified by the [mem] address. An example of a conditional jump type macroinstruction is an x86 Jcc instruction, such as JNE (jump if not equal), JZ (jump if zero), and so forth, which instructs the microprocessor 100 to jump to a target address (whose offset from the address of the instruction itself is specified in the Jcc instruction) if the condition is true and otherwise to continue fetching the next sequential instruction. Although examples of the LdAluSt and conditional jump type macroinstructions are mentioned above, it should be understood that many other x86 LdAluSt type and conditional jump type macroinstructions exist and new ones may be created in the future, for which the embodiments described herein may be applied to advantage.

A conventional instruction translator would translate the two macroinstructions 104 of the type just described into four distinct micro-ops 114. More specifically, the conventional instruction translator 108 would translate the LdAluSt macroinstruction into three micro-ops 114 and translate the conditional jump macroinstruction into a fourth micro-op 114. However, according to the present invention, the instruction translator 108 advantageously fuses the two macroinstructions 104 into three micro-ops 114. This is advantageous in that it may increase the instructions per clock cycle rate, or throughput, of the microprocessor 100 because fewer resources of the microprocessor 100 are used to process the two adjacent LdAluSt/conditional jump macroinstructions 104. For example, because one less micro-op 114 is dispatched to the portion of the microprocessor 100 pipeline below the instruction translator 108, one less entry in each of the RAT 116, reservation stations, and ROB 128 is consumed, which may effectively increase the lookahead capability of the out-of-order execution microprocessor 100 to take advantage of instruction-level parallelism, for example. Additionally, one less slot is taken up in the execution units 124, which may be used to execute another micro-op. The macroinstruction fusion is also advantageous in an instruction translator 108 that is capable of emitting a maximum of three micro-ops 114 per clock cycle because it enables the instruction translator 108 to consume more macroinstructions 104 per clock cycle. Still further, the ability to translate two macroinstructions in the same clock cycle allows the instruction translator 108 to see and translate subsequent macroinstructions sooner than if the instruction translator 108 had to wait an additional clock cycle to translate the conditional jump macroinstruction. This is particularly important for subsequent macroinstructions that are branch instructions. Furthermore, the ability to retire both the LdAluSt and conditional jump macroinstructions in the same clock cycle may increase throughput. Finally, a three-instruction-wide instruction translator 108 is potentially smaller, faster, and has lower power consumption than a four-instruction-wide instruction translator 108.

The microprocessor 100 also includes a control register 105 that includes a bit that instructs the instruction translator 108 whether or not to perform fusing according to the instruction fusing feature described herein.

Figure 2:
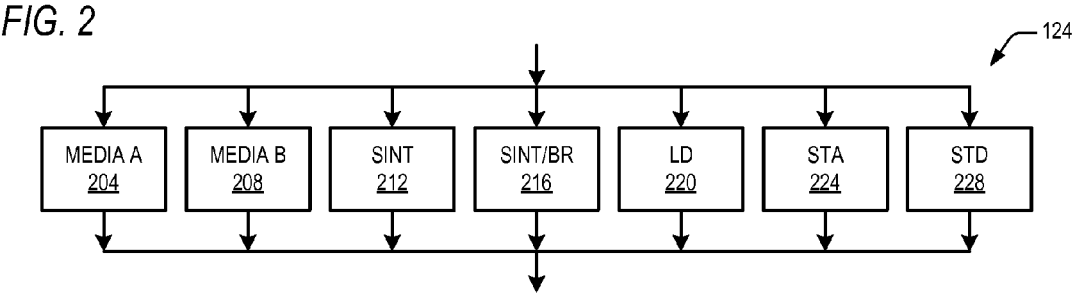
FIG. 2 is a block diagram illustrating in more detail the execution units of FIG. 1.

Referring now to FIG. 2, a block diagram illustrating in more detail the execution units 124 of FIG. 1 is shown. The embodiment of FIG. 2 includes seven individual execution units 124 denoted 204 through 228. The first execution unit, denoted MEDIA A 204, executes floating point micro-ops 114. The second execution unit, denoted MEDIA B 208, executes multiply micro-ops 114. The third execution unit, denoted SINT (Simple Integer) 212, executes integer ALU micro-ops 114 that perform integer arithmetic or logical operations. The fourth execution unit, denoted SINT/BR (Move/Branch) 216, executes move or branch micro-ops 114 as well as simple ALU operations, and executes ALU/JCC micro-ops 114 (of FIG. 3) generated by the instruction translator 108 when fusing LdAluSt and conditional jump type macroinstructions 104. The fifth execution unit, denoted LD (Load Data) 220, fetches source operands from memory into registers of the microprocessor 100 for micro-ops 114 that perform memory load operations, such as LD/STA micro-ops 114 (of FIG. 3) generated by the instruction translator 108 when fusing LdAluSt and conditional jump type macroinstructions 104. In order to fetch the source operands from memory, the LD unit 220 calculates the source memory address for micro-ops 114 that perform memory load operations, such as LD/STA micro-ops 114. In one embodiment, the LD unit 220 is the only execution unit 124 that calculates the source memory address for micro-ops 114 that perform memory load, or read, operations. The sixth execution unit, denoted STA (Store Address) 224, calculates the destination memory address for micro-ops 114 that perform memory store operations, such as LD/STA micro-ops 114. In one embodiment, the STA unit 224 is the only execution unit 124 that calculates the destination memory address for micro-ops 114 that perform memory store, or write, operations. The STA unit 224 also writes the calculated destination memory address into a store buffer 134 that was previously allocated for the micro-ops 114 that perform memory store operations, such as LD/STA micro-ops 114. The seventh execution unit, denoted STD (Store Data) 228, stores the results of micro-ops 114 from registers to an address in memory specified by the STA unit 224 for micro-ops 114 that perform memory store operations, such as a store data (STD) micro-op 114 (of FIG. 3) generated by the instruction translator 108 when fusing LdAluSt and conditional jump type macroinstructions 104. Although seven execution units 124 are shown, other embodiments are contemplated that include more or fewer execution units 124, depending on design requirements and constraints.

Figure 3:
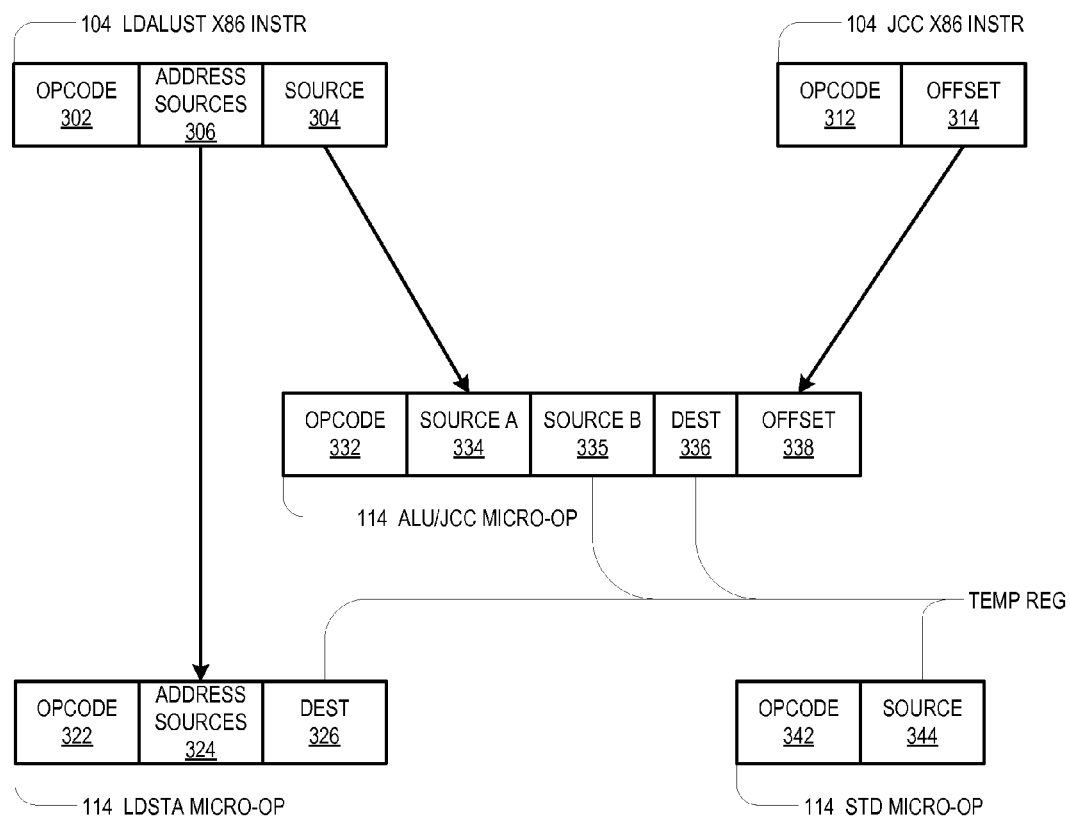
FIG. 3 is a block diagram illustrating fields of an x86 LDALUST type macroinstruction and an x86 JCC (conditional jump) macroinstruction and their fusion by the instruction translator of FIG. 1 into LDSTA, ALU/JCC, and STD micro-ops according to the present invention.

Referring now to FIG. 3, a block diagram illustrating fields of an x86 LDALUST type macroinstruction 104 and an x86 JCC (conditional jump) macroinstruction 104 and their fusion by the instruction translator 108 of FIG. 1 into LDSTA, ALU/JCC, and STD micro-ops 114 according to the present invention is shown.

The LDALUST macroinstruction 104 includes an opcode field 302, address source fields 306, and a data source field 304. The address source fields 306 specify operand sources, such as registers of the architectural registers 148 of FIG. 1, that provide operands used by the LD unit 220 and STA unit 224 of FIG. 2 to calculate a memory address. The memory address specifies the location in memory of a first data operand of the arithmetic/logical operation specified in the opcode 302. The memory address also specifies the location in memory of the destination of the result of the arithmetic/logical operation. The source field 304 specifies the source of a second data operand of the arithmetic/logical operation.

The JCC macroinstruction 104 includes an opcode field 312 and an offset field 314. The offset field 314 specifies an offset used to calculate the target address to which the fetch unit 103 transfers control if the condition specified in the opcode 312 is satisfied.

The LDSTA micro-op 114 includes an opcode field 322, address source fields 324, and a destination field 326. The instruction translator 108 transfers the values from the address source fields 306 of the LDALUST macroinstruction 104 to the address source fields 324 of the LDSTA micro-op 114. The instruction translator 108 populates the destination field 326 to specify a temporary register 502 (see FIG. 5) of the microprocessor 100.

The ALU/JCC micro-op 114 includes opcode 332, source A 334, source B 335, destination 336, and offset 338 fields. The instruction translator 108 transfers the value from the source field 304 of the LDALUST macroinstruction 104 to the source A 334 of the ALU/JCC micro-op 114. The instruction translator 108 transfers the value from the offset field 314 of the JCC macroinstruction 104 to the offset field 338 of the ALU/JCC micro-op 114. The instruction translator 108 populates the source B 335 and destination 336 fields of the ALU/JCC micro-op 114 to specify the temporary register 502.

The STD micro-op 114 includes an opcode 342 and a source 344 field. The instruction translator 108 populates the source 344 field of the STD micro-op 114 to specify the temporary register 502.

Figure 4:
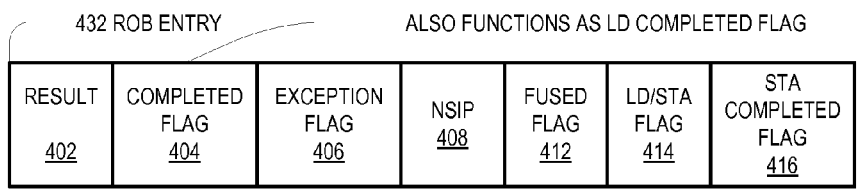
FIG. 4 is a block diagram illustrating an entry in the ROB of FIG. 1.

Referring now to FIG. 4, a block diagram illustrating an entry 432 in the ROB 128 of FIG. 1 is shown. The entry includes a result field 402 for storing a result of the micro-op 114, a completed flag 404, an exception flag 406, a next sequential instruction pointer (NSIP) field 408, a fused flag 412, a LD/STA flag 414, and an STA completed flag 416.

When an execution unit 124 completes execution of a micro-op 114, it sets the completed flag 404. As discussed in more detail herein, the LDSTA micro-op 114 is actually executed by two execution units 124, namely the LD unit 220 and the STA unit 224. When the LD unit 220 completes a LDSTA micro-op 114, it sets the completed flag 404; whereas, when the STA unit 224 completes a LDSTA micro-op 114, it sets the STA completed flag 416 rather than the completed flag 404. This enables the ROB 128 to detect that a LDSTA micro-op 114 (which is indicated by the LD/STA flag 414 being set) has completed, namely when both the completed flag 404 and the STA completed flag 416 are set.

When an execution unit 124 detects that a micro-op 114 causes an exception condition, the execution unit 124 sets the exception flag 406 in entry 432 allocated to the micro-op 114. When the micro-op 114 is ready to retire, if the ROB 128 detects that the exception flag 406 is set, the ROB 128 takes necessary action, such as refraining from updating the architectural state of the microprocessor 100 with the result of the micro-op 114 and/or invoking an exception handler, such as of the microcode unit 112, as described below.

The fused flag 412 indicates whether the micro-op 114 was translated from a fusion of two macroinstructions 104 by the instruction translator 108.

The NSIP field 408 holds the next sequential instruction pointer (NSIP), which is the memory address of the next sequential instruction after the macroinstruction 104 from which the micro-op 114 was translated. The NSIP flows down the pipeline with each micro-op 114. In the case of fused macroinstructions 104, the NSIP field 408 holds the memory address of the next sequential instruction after the last of the fused macroinstructions 104 from which the micro-op 114 was translated. The use of the NSIP field 408 is described in more detail below with respect to block 654 of FIG. 6.

Figure 6:
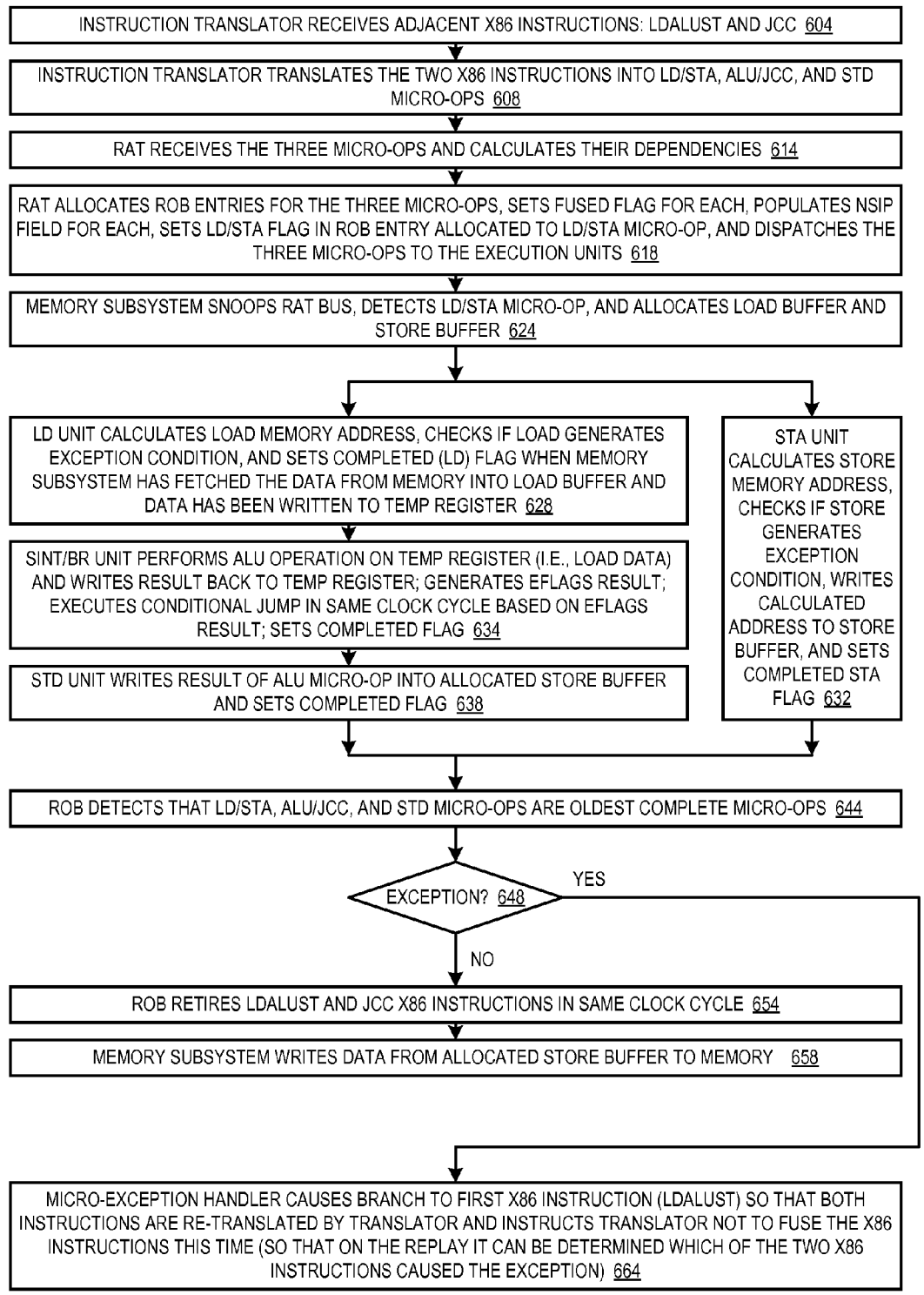
FIG. 6 is a flowchart illustrating operation of the microprocessor of FIG. 1 to perform instruction fusing and execution of the resultant translated micro-ops.

Referring now to FIG. 5 and FIG. 6, a block diagram and flowchart, respectively, illustrating operation of the microprocessor 100 of FIG. 1 to perform instruction fusing and execution of the resultant translated micro-ops 114 is shown. FIG. 5 will be described in conjunction with the flowchart of FIG. 6. Flow begins at block 604.

At block 604, the instruction translator 108 receives an x86 LDALUST type macroinstruction 104 and an adjacent x86 JCC type macroinstruction 104 from the instruction cache 102, as shown in FIG. 5. Flow proceeds to block 608.

At block 608, the instruction translator 108 translates the macroinstructions 104 received at block 604 into LDSTA, ALU/JCC, and STD micro-ops 114, as shown in FIG. 5. Additionally, the instruction translator 108 calculates the NSIP of the last of the fused macroinstructions 104, i.e., the memory address of the macroinstruction 104 after the JCC macroinstruction 104. Flow proceeds to block 614.

At block 614, the RAT 116 receives the LDSTA, ALU/JCC, and STD micro-ops 114 and calculates their dependencies, both upon other instructions and upon themselves. In particular, the ALU/JCC micro-op 114 is dependent upon the load data from the LD unit 220 execution of the load portion of the LDSTA micro-op 114, and the STD micro-op 114 is dependent upon the result of the ALU/JCC micro-op 114. That is, the ALU/JCC micro-op 114 cannot execute until the load data from the LDSTA micro-op 114 is available to it, and the STD micro-op 114 cannot execute until the result of the ALU/JCC micro-op 114 is available to it. Flow proceeds to block 618.

At block 618, the RAT 116 allocates three entries 432 in the ROB 128 for the LDSTA, ALU/JCC, and STD micro-ops 114 (denoted with index values 7, 8, and 9, respectively, in the example of FIG. 5). The RAT 116 also sets the fused flag 412 in each of the three entries 432 to indicate that they were translated from fused macroinstructions 104, as shown in FIG. 5. Additionally, the RAT 116 populates the NSIP field 408 of each of the entries 432 with the NSIP calculated at block 608, as shown in FIG. 5. The RAT 116 also sets the LD/STA flag 414 in the entry 432 allocated to the LDSTA micro-op 114, as shown in FIG. 5. Finally, the RAT 116 dispatches the three micro-ops 114 to reservation stations for execution by the execution units 124, as shown in FIG. 5. More specifically, the RAT 116 dispatches the LDSTA micro-op 114 to both the LD unit 220 and the STA unit 224, dispatches the ALU/JCC micro-op 114 to the SINT/BR unit 216, and dispatches the STD micro-op 114 to the STD unit 228. Flow proceeds to block 624.

At block 624, the memory subsystem 132 snoops the RAT 116 bus and detects the dispatch of the LDSTA micro-op 114 and responsively allocates a load buffer 136 and a store buffer 134. Flow proceeds concurrently to blocks 628 and 632.

At block 628, the LD unit 220 calculates the load memory address from the address sources 324 of FIG. 3 and checks to see if the load generates an exception condition. If so, the LD unit 220 sets the exception flag 406 in the ROB entry 432. Otherwise, the LD unit 220 sets the completed flag 404, as shown in FIG. 5, once the memory subsystem 132 has fetched the load data from memory into the load buffer 136 that was allocated at block 624 and the load data has been written to the temporary register 502. Flow proceeds from block 628 to block 634.

At block 634, the SINT/BR unit 216 performs the ALU operation specified by the ALU/JCC micro-op 114 on the operand in the temporary register 502 and the operand specified by the source A field 334 of the ALU/JCC micro-op 114 and stores the result back to the temporary register 502, as shown in FIG. 5. The SINT/BR unit 216 also generates an intermediate EFLAGS result based on the result of the ALU operation value written to the temporary register 502. Additionally, the SINT/BR unit 216 executes the conditional jump portion of the ALU/JCC micro-op 114 based on the intermediate EFLAGS result. That is, the SINT/BR unit 216 determines whether the intermediate EFLAGS result satisfies the specified condition and resolves the correct target address of the jump. If the condition is satisfied, the SINT/BR unit 216 signals the fetch unit 103 to begin fetching at the target address. In one embodiment, the microprocessor 100 includes a branch predictor (not show) that predicts the direction and target address of conditional branch instructions such as the fused JCC macroinstruction 104. In this embodiment, the SINT/BR unit 216 compares its direction and target address with the predicted direction and target address and if the prediction was incorrect, the SINT/BR unit 216 signals the fetch unit 103 to correct the mistake. Finally, the SINT/BR unit 216 sets the completed flag 404, as shown in FIG. 5. Flow proceeds from block 634 to block 638.

At block 638, the STD unit 228 writes the result of the ALU/JCC micro-op 114 from the temporary register 502 into the store buffer 134 allocated at block 624 and sets the completed flag 404, as shown in FIG. 5. In one embodiment, forwarding buses forward the execution unit 124 results back to the execution units 124 in order to avoid the delay associated with storing the results through the ROB 128. Flow proceeds from block 638 to block 644.

At block 632, the STA unit 224 calculates the store memory address from the address sources 324 of FIG. 3 and checks to see if the store generates an exception condition. If so, the STA unit 224 sets the exception flag 406 in the ROB entry 432. Otherwise, the STA unit 224 writes the calculated address to the store buffer 134 allocated at block 624 and sets the completed flag 404, as shown in FIG. 5. Flow proceeds from block 632 to block 644.

At block 644, the ROB 128 detects that the LDSTA, ALU/JCC, and STD micro-ops 114 are the oldest complete micro-ops 114 in the ROB 128. That is, the ROB 128 detects that the LD/STA, ALU/JCC, and STD micro-op entries 432 are at the head of the ROB 128, their completed flags 412 are set, and in the case of the LDSTA micro-op 114 its STA completed flag 416 is also set. Flow proceeds to decision block 648.

At decision block 648, the ROB 128 determines whether any of the LDSTA, ALU/JCC, and STD micro-ops 114 has caused an exception condition. That is, the ROB 128 determines whether the exception flag 406 is set in any of the ROB entries 432 allocated to the LDSTA, ALU/JCC, and STD micro-ops 114. If so, flow proceeds to block 664; otherwise, flow proceeds to block 654.

At block 654, the ROB 128 retires the LDALUST and JCC macroinstructions 104. In one embodiment, the ROB 128 retires the macroinstructions 104 in the same clock cycle, which includes updating the architectural instruction pointer 107. If the ALU/JCC micro-op 114 was not taken (i.e., the intermediate EFLAGS result calculated at block 634 does not satisfy the condition specified in the ALU/JCC micro-op 114), then the architectural instruction pointer 107 is updated with the value stored in the NSIP field 408 of the STD micro-op 114 (which is the same value stored in the NSIP field 408 of the LDSTA and ALU/JCC micro-ops 114); otherwise, the architectural instruction pointer 107 is updated with the target address calculated at block 634. In the embodiment in which the microprocessor 100 includes a branch predictor discussed above with respect to block 634, the architectural instruction pointer 107 is updated only if the branch direction or target address prediction was incorrect. Additionally, retiring the LDALUST macroinstruction 104 includes updating the architectural EFLAGS register with the intermediate EFLAGS result generated at block 634. Flow proceeds to block 658.

At block 658, the memory subsystem 132 writes the store data, which was written to the store buffer 134 at block 638, from the store buffer 134 to memory. Flow ends at block 658.

At block 664, because an exception was detected, the ROB 128 does not update the architectural state of the microprocessor 100 with the results of the LDSTA, ALU/JCC, and STD micro-ops 114. Instead, the ROB 128 invokes an exception handler in the microcode unit 112. The exception handler causes the fetch unit 103 to flush all instructions in the microprocessor 100 pipeline newer than the LDSTA micro-op 114. The exception handler also sets the fusing off bit in the control register 105 of FIG. 1 and causes the fetch unit 103 to branch back to the first fused macroinstruction 104, i.e., to the x86 LDALUST macroinstruction 104. This will cause the instruction translator 108 to re-translate the LDALUST macroinstruction 104 and the JCC macroinstruction 104; however, this time the instruction translator 108 will not fuse the two macroinstructions 104. Rather, the instruction translator 108 will translate them in a conventional manner into four distinct micro-ops 114; namely, the instruction translator 108 will translate the LDALUST macroinstruction 104 into a LDSTA micro-op 114, an ALU micro-op 114, and a STD micro-op 114, and will translate the JCC macroinstruction 104 into a JCC micro-op 114. Consequently, the RAT 116 will not set the fused flag 412 in the ROB entries 432 allocated for the four micro-ops 114, and the RAT 116 will populate the NSIP field 408 of the conventional LDSTA, ALU, and STD micro-ops 114 with the memory address of the JCC macroinstruction 104 and will populate the NSIP field 408 of the JCC micro-op 114 with the memory address of the next sequential macroinstruction 104 after the JCC macroinstruction 104. Therefore, when the replay of the micro-ops 114 translated from the two macroinstructions 104 occurs, it will be possible for the ROB 128 to determine which of the two macroinstructions 104 caused the exception condition so that the microprocessor 100 can handle the exception appropriately. In one embodiment, the exception handler write to the fusing off bit in the control register 105 creates a pulse to the instruction translator 104 that causes the instruction translator 108 to not fuse the next macroinstruction 104 it encounters (i.e., the LDALUST macroinstruction 104 that is followed by the JCC macroinstruction 104), but to resume fusing instructions thereafter when possible. Flow ends at block 664.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to receive first and second program-adjacent macroinstructions of the instruction set architecture of the microprocessor, wherein the first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result, wherein the second macroinstruction instructs the microprocessor to jump to a target address if the updated condition codes satisfy a condition specified by the second macroinstruction and to otherwise execute the next sequential instruction, the microprocessor comprising:

hardware execution units; and an instruction translator, configured to simultaneously translate the first and second program-adjacent macroinstructions into first, second, and third micro-operations for execution by the hardware execution units;

wherein the first micro-operation instructs the hardware execution units to calculate the memory location address and to load the operand from the memory location address into the microprocessor;

wherein the second micro-operation instructs the hardware execution units to perform the arithmetic/logic operation using the loaded operand to generate the result, to update the condition codes based on the result, and to jump to the target address if the updated condition codes satisfy the condition and to otherwise execute the next sequential instruction;

wherein the third micro-operation instructs the hardware execution units to store the result to the memory location;

wherein if one or more of the first, second, and third micro-operations causes an exception condition, the microprocessor is configured to cause the instruction translator to re-translate the first and second program-adjacent macroinstructions into more than three micro-operations and to cause the hardware execution units to execute the more than three micro-operations;

wherein a first of the more than three micro-operations instructs the hardware execution units to perform the arithmetic/logic operation using the loaded operand to generate the result and updates the condition codes based on the result; and wherein a second of the more than three micro-operations instructs the hardware execution units to jump to the target address if the update condition codes satisfy the condition and to otherwise execute the next sequential instruction.

2. The microprocessor of claim 1, wherein the instruction set architecture of the microprocessor conforms to the x86 architecture.

3. The microprocessor of claim 1, wherein the hardware execution units comprise:

a first execution unit, configured to calculate the memory location address and to cause the operand to be loaded from the memory location address into a register of the microprocessor, in response to receiving the first micro-operation;

a second execution unit, configured to perform the arithmetic/logic operation using the operand in the register to generate the result, to update the condition codes based on the result, and to jump to the target address if the updated condition codes satisfy the condition and to otherwise execute the next sequential instruction, in response to receiving the second micro-operation; and a third execution unit, configured to cause the result to be stored to the memory location, in response to receiving the third micro-operation.

4. The microprocessor of claim 3, wherein the second execution unit is configured to perform the arithmetic/logic operation using the operand in the register to generate the result, to update the condition codes based on the result, and to jump to the target address if the updated condition codes satisfy the condition and to otherwise execute the next sequential instruction in a single clock cycle of the microprocessor.

5. The microprocessor of claim 3, further comprising:

a store buffer, configured to hold the result while waiting to be written to memory;

wherein the hardware execution units further comprise:

a fourth execution unit, configured to calculate the memory location address and to write the calculated memory location address to the store buffer, in response to receiving the first micro-operation.

6. The microprocessor of claim 5, further comprising:

a reorder buffer, each entry thereof associated with a distinct micro-operation and having a first flag settable by the first execution unit to indicate completion of its portion of the first micro-operation and a second flag settable by the fourth execution unit to indicate completion of its portion of the first micro-operation; and a retire unit, configured to wait to update the architectural state of the microprocessor until both the first and second flags are set.

7. The microprocessor of claim 3, wherein the second execution unit is further configured to calculate the target address.

8. The microprocessor of claim 1, wherein the second microinstruction is further configured to instruct the hardware execution units to calculate the target address.

9. The microprocessor of claim 1, further comprising:

a reorder buffer, each entry thereof associated with a distinct micro-operation and having a field configured to hold a next sequential instruction pointer;

wherein in response to the instruction translator simultaneously translating the first and second program-adjacent macroinstructions into first, second, and third micro-operations, the microprocessor populates the field of the entry associated with the first, second, and third micro-operations with the memory address of the macroinstruction immediately following the second macroinstruction;

wherein in response to the instruction translator re-translating the first and second program-adjacent macroinstructions into more than three micro-operations, the microprocessor populates the field of the entry associated with each micro-operation of the more than three micro-operations with the memory address of the one of the first and second macroinstructions from which the micro-operation was translated.

10. The microprocessor of claim 9, further comprising:

an architectural instruction pointer of the microprocessor; and a retire unit, wherein if none of the first, second, and third micro-operations causes an exception condition and if the updated condition codes do not satisfy the condition, the retire unit is configured to retire both the first and second macroinstructions in the same clock cycle and to update the architectural instruction pointer with the memory address of the macroinstruction immediately following the second macroinstruction.

11. The microprocessor of claim 1, further comprising:

a reorder buffer, each entry thereof associated with a distinct micro-operation and having a flag;

wherein in response to the instruction translator simultaneously translating the first and second program-adjacent macroinstructions into first, second, and third micro-operations, the microprocessor is configured to set the flag for each of the entries associated with the first, second, and third micro-operations to a first predetermined value;

wherein in response to the instruction translator re-translating the first and second program-adjacent macroinstructions, the microprocessor is configured to set the flag for each of the entries associated with the more than three micro-operation to a second predetermined value distinct from the first predetermined value.

12. A method for a microprocessor to process first and second program-adjacent macroinstructions of the instruction set architecture of the microprocessor, wherein the first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result, wherein the second macroinstruction instructs the microprocessor to jump to a target address if the updated condition codes satisfy a condition specified by the second macroinstruction and to otherwise execute the next sequential instruction, the method comprising:

simultaneously translating the first and second program-adjacent macroinstructions into first, second, and third micro-operations for execution by execution units of the microprocessor;

wherein the first micro-operation instructs the execution units to calculate the memory location address and to load the operand from the memory location address into the microprocessor;

wherein the second micro-operation instructs the execution units to perform the arithmetic/logic operation using the loaded operand to generate the result, to update the condition codes based on the result, and to jump to the target address if the updated condition codes satisfy the condition and to otherwise execute the next sequential instruction;

wherein the third micro-operation instructs the execution units to store the result to the memory location; and re-translating the first and second program-adjacent macroinstructions into more than three micro-operations and causing the execution units to execute the more than three micro-operations, if one or more of the first, second, and third micro-operations causes an exception condition;

wherein a first of the more than three micro-operations instructs the execution units to perform the arithmetic/logic operation using the loaded operand to generate the result and updates the condition codes based on the result; and wherein a second of the more than three micro-operations instructs the execution units to jump to the target address if the update condition codes satisfy the condition and to otherwise execute the next sequential instruction.

13. The method of claim 12, wherein the instruction set architecture of the microprocessor conforms to the x86 architecture.

14. The method of claim 12, wherein the first micro-operation further instructs the execution units to write the calculated memory location address to a store buffer of the microprocessor configured to hold the result while waiting to be written to memory.

15. The method of claim 14, wherein the microprocessor also includes a reorder buffer, each entry thereof associated with a distinct micro-operation and having a first flag settable by a first of the execution units to indicate completion of its portion of the first micro-operation and a second flag settable by a second of the execution units to indicate completion of its portion of the first micro-operation, the method further comprising:

waiting to update the architectural state of the microprocessor until both the first and second flags are set.

16. The method of claim 12, wherein the second microinstruction is further configured to instruct the execution units to calculate the target address.

17. The method of claim 12, wherein the microprocessor also includes a reorder buffer each entry thereof associated with a distinct micro-operation and having a field configured to hold a next sequential instruction pointer, the method further comprising:

populating the field of the entry associated with the first, second, and third micro-operations with the memory address of the macroinstruction immediately following the second macroinstruction, in response to said simultaneously translating the first and second program-adjacent macroinstructions into first, second, and third micro-operations;

populating the field of the entry associated with each micro-operation of the more than three micro-operations with the memory address of the one of the first and second macroinstructions from which the micro-operation was translated, in response to said re-translating the first and second program-adjacent macroinstructions into more than three micro-operations.

18. The method of claim 17, wherein the microprocessor also includes an architectural instruction pointer and a retire unit, the method further comprising:

retiring both the first and second macroinstructions in the same clock cycle and updating the architectural instruction pointer with the memory address of the macroinstruction immediately following the second macroinstruction, if none of the first, second, and third micro-operations causes an exception condition and if the updated condition codes do not satisfy the condition.

19. A computer program product encoded in at least one non-transitory computer readable medium for use with a computing device, the computer program product comprising:

computer readable program code embodied in said medium, for specifying a microprocessor configured to receive first and second program-adjacent macroinstructions of the instruction set architecture of the microprocessor, wherein the first macroinstruction instructs the microprocessor to load an operand from a location in memory into the microprocessor, to perform an arithmetic/logic operation using the loaded operand to generate a result, to store the result back to the memory location, and to update condition codes of the microprocessor based on the result, wherein the second macroinstruction instructs the microprocessor to jump to a target address if the updated condition codes satisfy a condition specified by the second macroinstruction and to otherwise execute the next sequential instruction, the computer readable program code comprising:

first program code for specifying execution units; and second program code for specifying an instruction translator, configured to simultaneously translate the first and second program-adjacent macroinstructions into first, second, and third micro-operations for execution by the execution units;

wherein the first micro-operation instructs the execution units to calculate the memory location address and to load the operand from the memory location address into the microprocessor;

wherein the second micro-operation instructs the execution units to perform the arithmetic/logic operation using the loaded operand to generate the result, to update the condition codes based on the result, and to jump to the target address if the updated condition codes satisfy the condition and to otherwise execute the next sequential instruction;

wherein the third micro-operation instructs the execution units to store the result to the memory location;

wherein if one or more of the first, second, and third micro-operations causes an exception condition, the microprocessor is configured to cause the instruction translator to re-translate the first and second program-adjacent macroinstructions into more than three micro-operations and to cause the hardware execution units to execute the more than three micro-operations;

wherein a first of the more than three micro-operations instructs the hardware execution units to perform the arithmetic/logic operation using the loaded operand to generate the result and updates the condition codes based on the result; and wherein a second of the more than three micro-operations instructs the hardware execution units to jump to the target address if the updated condition codes satisfy the condition and to otherwise execute the next sequential instruction.

20. The computer program product of claim 19, wherein the at least one non-transitory computer readable medium is selected from the set of a disk, tape, or other magnetic, optical, or electronic storage medium.

\* \* \* \* \*